United States Patent [19]

Raines et al.

[11] Patent Number: 4,664,800
[45] Date of Patent: May 12, 1987

[54] MICRON CHAMBER I.V. WITH SUPPORT RING

[75] Inventors: Kenneth Raines; John McGaughey, both of Bethlehem, Pa.

[73] Assignee: Burron Medical Inc., Bethlehem, Pa.

[21] Appl. No.: 712,677

[22] Filed: Mar. 18, 1985

[51] Int. Cl.⁴ .............................................. B01D 35/00
[52] U.S. Cl. .................................... 210/445; 210/451; 210/455; 210/927; 604/126
[58] Field of Search ............... 210/645, 927, 445, 446, 210/447, 453, 455, 321.1, 232, 435, 450, 451, 454; 604/126, 252

[56] References Cited
U.S. PATENT DOCUMENTS

| | | | |
|---|---|---|---|
| 2,521,212 | 6/1985 | Ruschke | 604/126 |
| 2,696,818 | 12/1954 | Loghem | 604/252 |
| 3,658,183 | 4/1972 | Best et al. | 210/446 |
| 3,722,697 | 3/1973 | Burke et al. | 604/252 |
| 3,967,620 | 7/1976 | Noiles | 210/927 |
| 4,056,100 | 11/1977 | Noiles | 210/927 |
| 4,113,627 | 9/1978 | Leason | 604/126 |
| 4,127,131 | 11/1978 | Vaillancourt | 210/927 |
| 4,525,182 | 6/1985 | Rising et al. | 55/159 |
| 4,529,419 | 7/1985 | Perl et al. | 210/436 |

FOREIGN PATENT DOCUMENTS

| | | | |
|---|---|---|---|
| 2420350 | 11/1979 | France | 604/252 |
| 667933 | 3/1952 | United Kingdom | 604/252 |

Primary Examiner—Richard V. Fisher
Assistant Examiner—Wanda L. Millard
Attorney, Agent, or Firm—Shoemaker and Mattare, Ltd.

[57] ABSTRACT

A small micron filter unit comprising a main body connector unit, a single structure filter element, and an adapter unit for complementary engagement with the connector and for receiving and holding the single filter element. Preferably, the adapter unit is of soft material, such as flexible PVC, which allows the adapter unit to expand and receive a ring with ridge of the single filter element within a recess thereof. The ridge on the external circumference of the filter element ring forms a resilient indent in the flexible PVC material of the adapter. The compressive force exerted by the adapter around the filter ring functions to securely retain it in place and also forms a fluid and air axial seal. After assembly of the adapter unit within the connector body unit, an overall leakproof component filter device is formed. For further assurance of leakproofness, a plastic solvent such as THF can be applied between the adapter and connector units externally at the junction thereof for forming a permanently bonded component filter device.

12 Claims, 8 Drawing Figures

MICRON CHAMBER I.V. WITH SUPPORT RING

BACKGROUND OF THE INVENTION

1. Field of the Invention

This invention relates generally to filter devices, and especially to filters of small micron particle blocking capability for use with intravenous drip chambers.

2. Description of the Prior Art

A common problem with known filters of conventional type for use with intravenous drip chambers is that they have a tendency for the filter membrane to dislodge and/or move out of the proper filtering position. This can either block fluid flow and/or permit small sized particulates to pass. In either case, the result is very undesirable.

Another problem with known type filter devices is that they are relatively complicated to manufacture, and not always leakproof, and fail to properly block small particulates, especially of approximately 15 micron size.

The prior art U.S. Pat. No. 3,658,183 discloses a filter having an upper and lower housing element, both being provided with mating sections to facilitate locking same together. A filter material 10 is adapted to rest on the marginal edges 16 of the lower filter element. After being positioned thereon, the lower element is pushed into engagement with the upper element, and the flexible portions 23 flex sufficiently to allow the lowermost element to be pushed into firm contact with the upper element and to be locked in position, as shown in FIG. 2 of the patent drawings. However, this device does not have a single seat inside an adapter for positioning and retaining a filter ring with the filter ring having an integral filter membrane therewith. Also, the device is not intended for a permanent assembly, but the mating parts are disassembleable so that the filter element can be removed. Also, the membrane is supported by radially spaced raised annular ribs or rings for providing intermediate support of the relatively large filter element. Furthermore, the rings are divided into arcuate sections by radially extending fluid flow channels. This structure of a series of spaced ribs together with traverse slots for fluid flow is not present in the present invention. Also, the method of assembly and making of the present device is substantially different from that of this patent.

Neither this patent nor any other known prior art devices offer the new and novel features of the present invention.

SUMMARY OF THE INVENTION

An object of the present invention is to provide a filter device having a one-piece membrane and filter ring as an integral component unit.

Another object of the present invention is to provide a filter element having a base adapter unit, a one-piece integral filter ring and membrane, and a connector unit all assembled so that the one-piece filter element will be securely retained in proper position within and between the other two units.

A further object of this invention is to provide a filter device wherein one unit provides a seat and sealing portion therewith for use with an integral filter element having a thin membrane with pores which will block particulates of 15 micron size or greater.

A still further object of the present invention is to provide a filter element of permanent assembly including an integral filter element of small micron particulate size blocking capability, and a soft base adapter unit for compressively holding the one-piece filter element in proper place, and a rigid plastic connector which provides additional compressive force to that already present with the base adapter unit, and, once assembled, a final sealing permanently by plastic solvent at the junction between the adapter and connector units.

The present invention has a number of new and novel features. Among them is a one-piece ring and membrane filter element, preferably made of nylon, wherein the pores of the membrane portion will block small particulates of 15 micron size or greater. A soft base adapter unit is molded so as to be provided with a single seat sealing surface and a recessed portion for receiving the ring of the one-piece filter element therewithin. Thus, the integral filter element will be securely and accurately positioned in sealing and filtering position with the soft base adapter unit. A rib on the circumference of the filter ring together with the compressive force of the soft base adapter effects a compressive force during assembly so that the filter member will be retained in position due to the compressive force of the soft base adapter outer flange against the outer circumference of the one-piece filter element. After this assembly has been made, then a rigid connector unit is applied thereover for adding additional compressive force to the outer circumference of the soft base adapter unit, and to provide multiple compression forces against the filter element. These multiple compression forces create a very effective fluid seal of the overall device.

As a further backup, once the components have been assembled as described, then a plastic solvent, such as THF, can be applied at the junction between the rigid connector unit and the soft base adapter unit for permanently affixing these units together, with the single element filter ring and membrane securely locked therebetween.

A cylindrical rib on the inner circumference of the rigid connector will form an effective lock between the outer circumference of the soft base adapter and the rigid connector unit. Furthermore, the connecting portion of the rigid connector may be provided with additional ribs for interlocking with a fluid supply structure. Also, the soft base adapter is preferably provided with ejector bosses spaced approximately 120° apart on the underside flange thereof.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
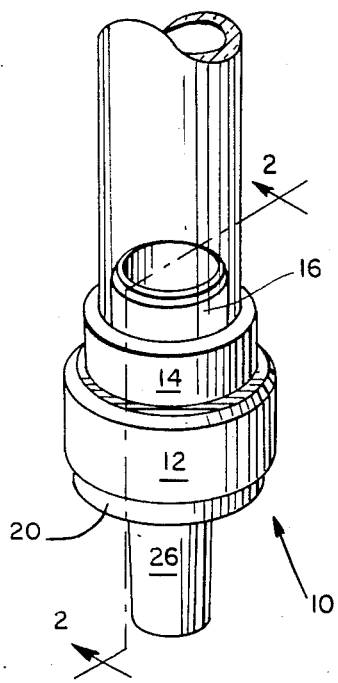
FIG. 1 is a perspective view of the 15 micron IV chamber filter of the present invention as mounted on the lower end of an intravenous fluid chamber.
Figure 2:
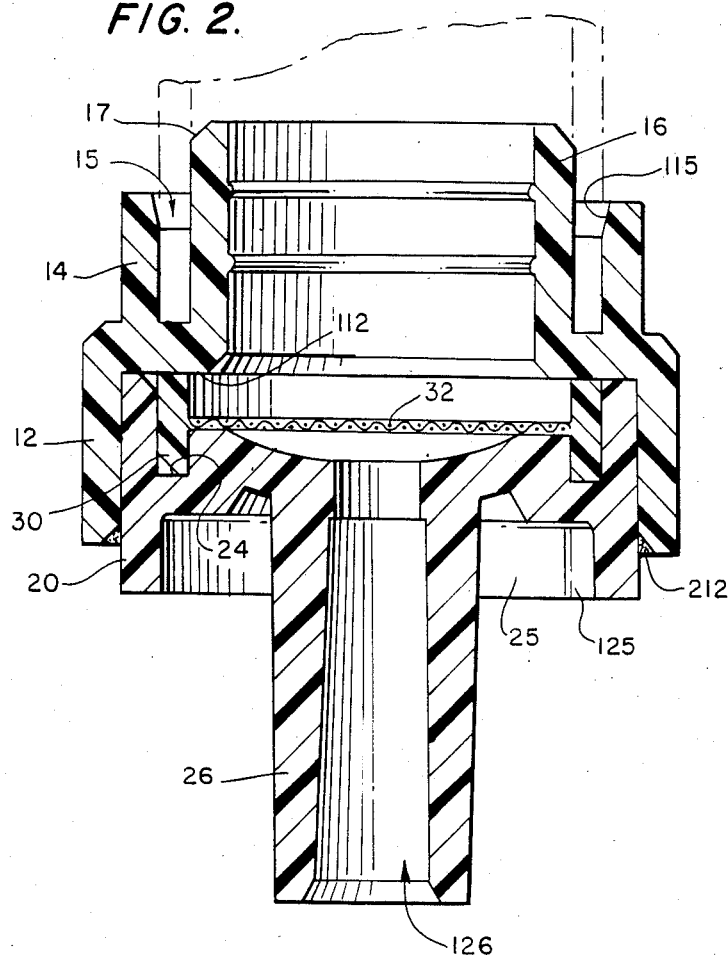
FIG. 2 is a cross-sectional view taken along line 2'2 of FIG. 1.
Figure 3:
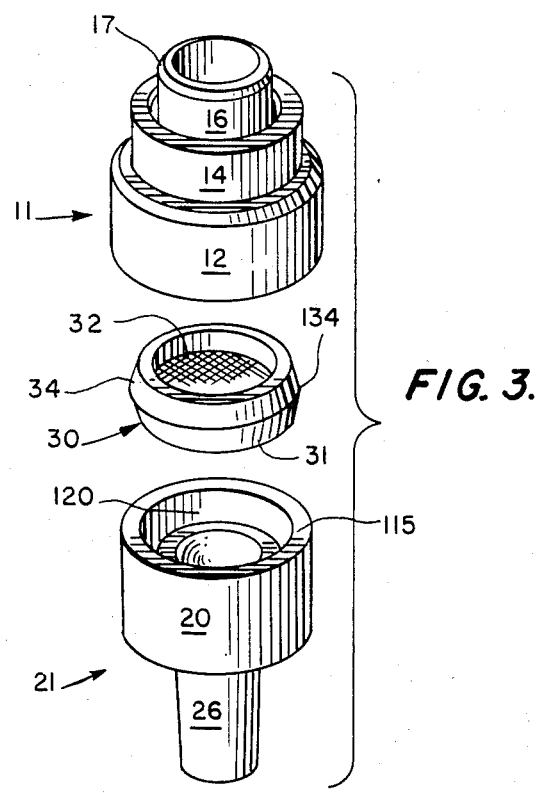
FIG. 3 is an exploded perspective showing the component elements of the present invention.
Figure 4:
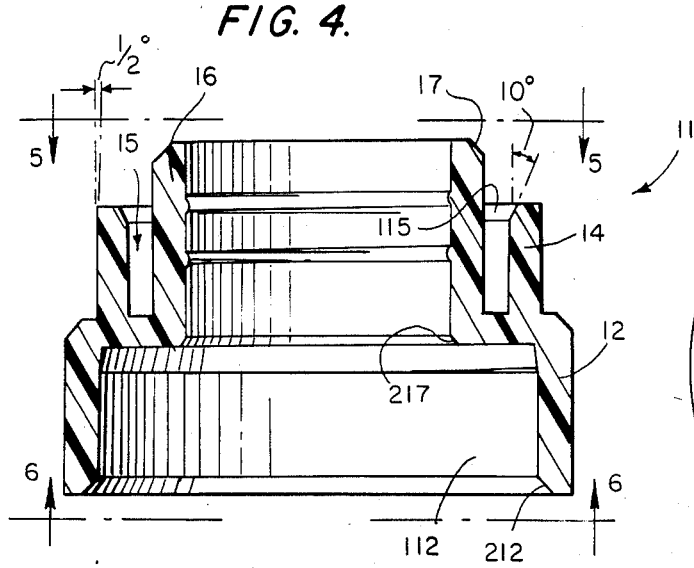
FIG. 4 is a side elevational view, partly in cross-section, of the rigid connector unit per se.
Figure 5:
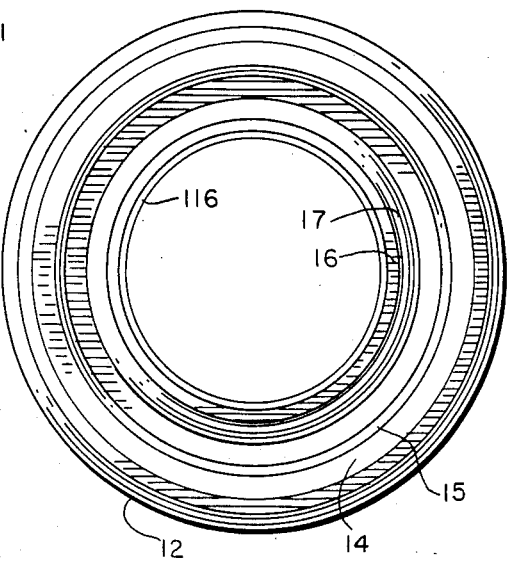
FIG. 5 is a top plan view taken along line 5—5 of FIG. 4.
Figure 6:
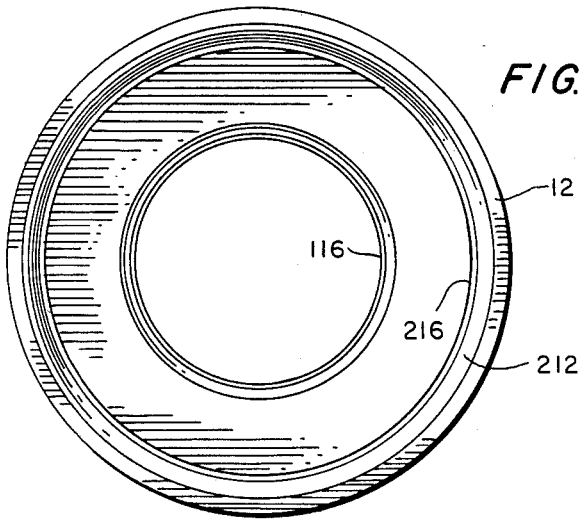
FIG. 6 is a bottom plan view taken along line 6—6 of FIG. 4.

Referring to FIG. 1 of the drawing, reference numeral 10 indicates in general the filter device of the present invention. As best seen in FIGS. 2 and 3, the filter device comprises a connector unit 12 having a pair of cylindrical extensions 14 and 16 therewith. The cylindrical extension 14 is of larger diameter than the cylindrical extension 16. However, the inner cylindrical extension 16 is of greater length axially than that of cylindrical extension 14. A recess 15 is thus formed between the two cylindrical extensions. Note that the cylindrical extension 16 has a chamfered surface 17 of approximately 45° along the outer circumferential edge thereof. The cup-like lower portion of the connector unit 12 has a smooth, inner cylindrical wall surface 112. Preferably, the connector unit just described is made of rigid, clear plastic material, such as clear, rigid PVC.

The primary filtering element of the present invention is a one-piece filter ring 30 with filter membrane 32 within a cylinder ring 31, the outer circumference of ring 31 having double beveled surfaces 34 meeting at junction ridge 134. This filter structure is molded as an integral unit from preferably nylon material. The pores of the membrane 32 are designed so as to block small particulates of 15 micron size or greater.

Figure 7:
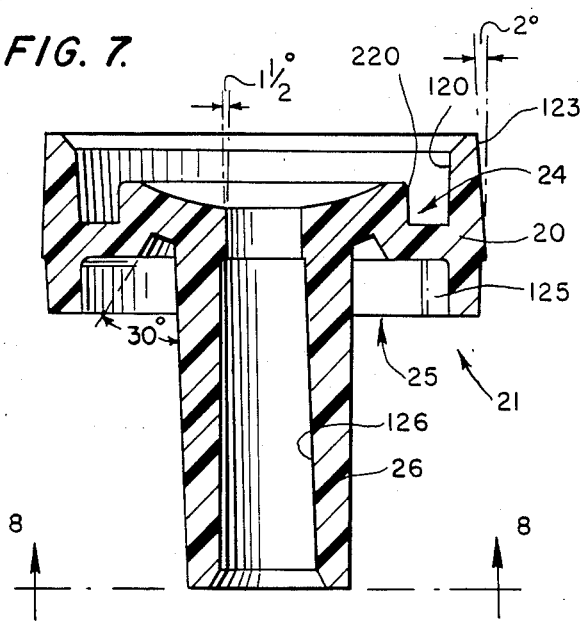
FIG. 7 is a side elevational view, partly in cross-section, of the soft base adapter unit per se.
Figure 8:
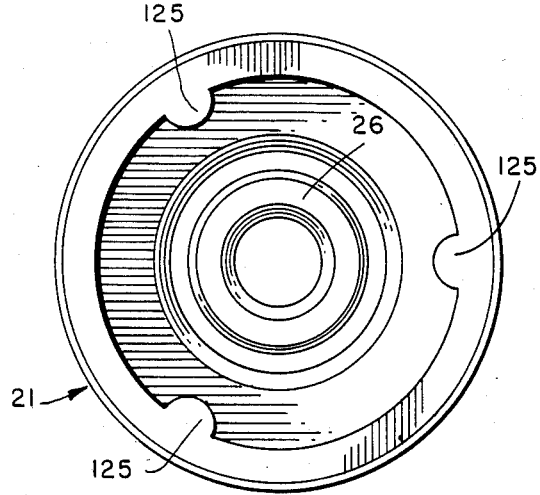
FIG. 8 is a bottom plan view taken along line 8—8 of FIG. 7.

The third component of the present invention is the base adapter 21. This base adapter has a body 20 with a recess 24 defined between the cylindrical surface wall 120 thereof and the inner support 220. This recess 24 receives the lower half of the filter ring 31 (shown assembled in FIG. 2), and thereby positively and securely aligns and affixes the single element filter unit 30 with the base adapter 21. The ridge 134 of the filter ring wedges against surface 120 for a tight, sealing compression fit. Mounted within the cylindrical recess 25 of the base adapter are a plurality of ejector bosses 125. These bosses are preferably three in number and spaced approximately 120° apart (see FIG. 8). The adapter unit 21 is also provided with a projecting outlet 26 having an outlet opening 126 therethrough. As best seen in FIGS. 3 and 7, preferably the outer circumference of the base adapter 21 has an inward taper of approximately 2° from the lower edge to the upper edge thereof. This is to facilitate the assembly and mounting of the base adapter within the lower cup-like cylindrical half of the connector unit 12. Preferably, the base adapter unit 21 is made of soft, flexible plastic material, such as clear, soft PVC.

The method of making and assembly of the component units of the present invention is also part of this invention. Each of the component units 11, 21 and 30 are molded of the desired type of material, that is, rigid PVC is used for molding the connector unit 11, soft flexible PVC is used for molding the base adapter unit 21, and nylon is used for molding the single element filter 30 including the ring 31 and membrane 32.

A very important feature of the present invention is the filter element 30 of single, one-piece construction, molded integrally of nylon. The molded membrane 32 preferably has pores which will block small particulates of any size greater than 15 microns. During the molding the ridge 134 is integrally formed around the circumference of ring 37 at approximately the center thereof.

During assembly of the component units into a permanently assembled filter device, the one-piece filter element 30 has the soft base adapter 21 pressed thereover. The soft base adapter wall 115 will expand so as to allow the ridge 134 of filter ring 31 to pass into mating position as depicted in FIG. 2, and then will trap the single filter element in engagement with the adapter. The compression forces exerted by the surface 120 of the wall 115 of the soft base adapter 21 against the outer beveled surfaces 34 and ridge 134 of the filter ring securely retains the ring 31 of the single filter element 30 within the recess 24 of the soft base adapter 21.

Next, this sub-assembly is pressed into the rigid connector 12 and the tapered outer surface 123 permits easy guiding and insertion of the adapter into the connector 12. The rigid connector 12 also exerts compression force around the base adapter unit and increases the compression between the adapter unit and the single filter ring. Thus, a multiple compression force is created for a very effective leakproof fluid seal. As further protection against inadvertent disassembly of the component units, the external junction of the adapter 21 and the connector lower portion 11 can be bonded by appropriate plastic solvent, such as THF, to securely hold same together. As seen in FIG. 2, a recess 212 is appropriately provided around the inner circumferential edge of the connector lower portion 11 for reception of this solvent material for forming a permanent assembly of the component units.

Of course, once assembled, this unit can be mounted as the bottom of an intravenous drip chamber unit as is conventional in the art. However, while preferably this 15 micron filter unit is used with a drip chamber, it can have other useful applications with other type liquid supply and flow devices.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A micron filter device comprising:
    rigid connector means for attachment to a liquid supply;
    a single integral filter means;
    a soft base adapter means for receiving and holding said single integral filter means;
    multiple means for retaining said connector means, filter means and base adapter means together in an assembled relationship;
    said rigid connector means comprising a cylindrical main body member having at least one cup-like portion for receiving said single integral filter means and said soft base adapter means therewithin;
    said single integral filter means including a support ring together with a central filter membrane completely across the inside of said support ring; and
    said support ring being completely around the circumference of the filter membrane.

2. The micron filter device defined in claim 1, wherein said multiple means for retaining said components together includes a ridge formed on the support ring of said single filter means around the circumference thereof, and said soft base adapter means expanding and contracting around said ridge when the filter means and base adapter means are assembled together.

3. The micron filter device defined in claim 2, wherein said multiple means further includes said rigid connector means exerting a compression force on said soft base adapter means after said single filter means has been mounted therewith.

4. The micron filter device defined in claim 3, together with plastic solvent added at the external junction between said rigid connector means and said soft base adapter means for preventing any axial movement therebetween after the final assembly thereof.

5. The micron filter device defined in claim 1, wherein said soft base adapter means includes a pair of cup-like cylinders back-to-back, with one of said cup-like cylinders being provided with a single filter receiving means therewithin.

6. The micron filter device defined in claim 5, wherein said single filter receiving means of said one cup-like cylinder comprises a recess provided in said one cup-like cylinder for the purpose of receiving said ring of the single filter means therewithin.

7. The micron filter device defined in claim 1, wherein said main body member further includes a pair of spaced cylinders on the main body member opposite to said cup-like portion.

8. The micron filter defined in claim 1, wherein said membrane has pores of approximately 15 micron size, and both said membrane and support ring are integrally molded from nylon.

9. A 15 micron filter device comprising:
a connector unit for use as a main body of the filter, a base adapter for complementary reception within said connector unit, a single integral filter element having a circumferential support ring completely therearound mounted between said connector unit and said base adapter, and multiple means cooperating with said filter ring for retaining said components together in assembled relationship.

10. The 15 micron filter device defined in claim 9, wherein said single integral filter element is molded in one piece of nylon.

11. The 15 micron filter device defined in claim 9, wherein said connector unit is formed of rigid PVC.

12. The 15 micron filter device defined in claim 9, wherein said base adapter is formed of soft PVC.

* * * * *